United States Patent
Kawamura et al.

(10) Patent No.: US 8,040,085 B2
(45) Date of Patent: Oct. 18, 2011

(54) BRUSHLESS MOTOR APPARATUS

(75) Inventors: Satoshi Kawamura, Tokyo (JP);
Masayuki Yokoyama, Tokyo (JP);
Kazuaki Shinya, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 254 days.

(21) Appl. No.: 12/225,242

(22) PCT Filed: Apr. 27, 2007

(86) PCT No.: PCT/JP2007/059228
§ 371 (c)(1),
(2), (4) Date: Sep. 17, 2008

(87) PCT Pub. No.: WO2007/148480
PCT Pub. Date: Dec. 27, 2007

(65) Prior Publication Data
US 2010/0225259 A1    Sep. 9, 2010

(30) Foreign Application Priority Data
Jun. 23, 2006  (JP) .................................. 2006-174101

(51) Int. Cl.
*H02P 6/00* (2006.01)
*H02K 1/27* (2006.01)
*H02K 29/08* (2006.01)
(52) U.S. Cl. ............... 318/400.01; 318/400.38; 310/179
(58) Field of Classification Search ............. 318/400.01, 318/400.29, 400.37, 400.38, 400.39, 400.4, 318/400.42; 310/179, 184, 198, 208
See application file for complete search history.

(56) References Cited

U.S. PATENT DOCUMENTS

| 5,723,931 | A  | * | 3/1998 | Andrey .................... 310/179 |
| 6,396,225 | B1 | * | 5/2002 | Wakui et al. ............. 318/400.01 |
| 6,512,341 | B2 | * | 1/2003 | Matsushiro et al. ..... 318/400.07 |
| 7,541,760 | B2 | * | 6/2009 | Lin et al. ................. 318/400.01 |
| 2006/0113949 | A1 | * | 6/2006 | Nishimura et al. ........... 318/723 |

FOREIGN PATENT DOCUMENTS

| JP | 1-308192 A | 12/1989 |
| JP | 2-237490 A | 9/1990 |
| JP | 7-222485 A | 8/1995 |
| JP | 2002-252958 A | 9/2002 |
| JP | 2002-369576 A | 12/2002 |
| JP | 2005-312145 A | 11/2005 |

* cited by examiner

*Primary Examiner* — Eduardo Colon Santana
(74) *Attorney, Agent, or Firm* — Birch, Stewart, Kolasch & Birch, LLP

(57) ABSTRACT

A brushless motor apparatus includes a fixedly arranged stator 14, a rotor 12 rotated in a manner sequentially excited by a plurality of excitation patterns, a magnetic-pole-position detecting magnet 16 fixed to the rotor and having twice the number of poles of the rotor, and a position detecting element 18 arranged opposite to the magnetic-pole-position detecting magnet and detecting the position of magnetic poles of the rotor, and further includes a motor drive circuit serving as a control such that when the stator is excited with a different excitation pattern between regular excitation patterns on normal operation at the time of phase matching carried out upon actuation of a power source, the rotation angle of the rotor is one-half the rotation angle corresponding to the regular excitation pattern.

3 Claims, 17 Drawing Sheets

Hatched Portion Indicates N Pole of Rotor

FIG. 2
Amount of Lift of Valve Versus Characteristics of the Number of Counts of Hall IC
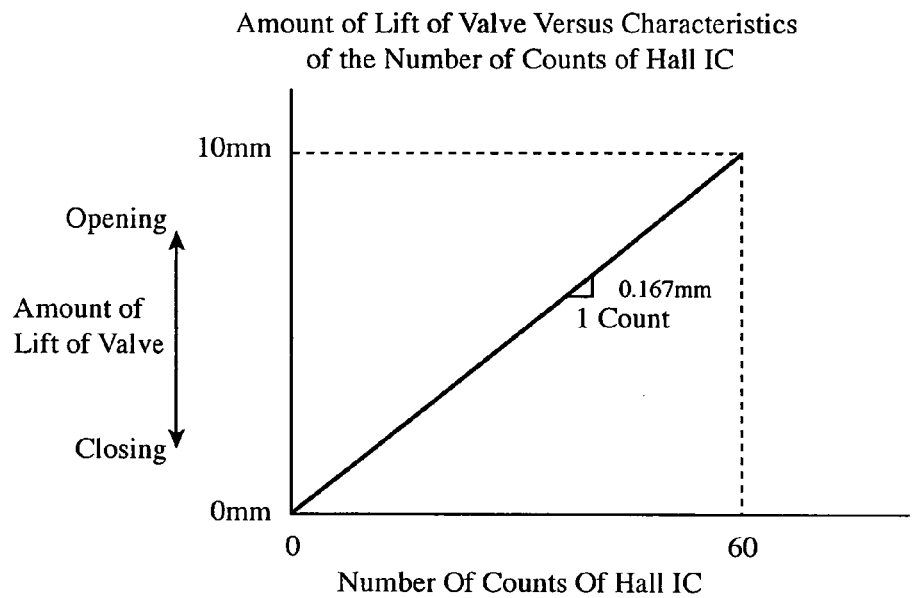
FIG. 3
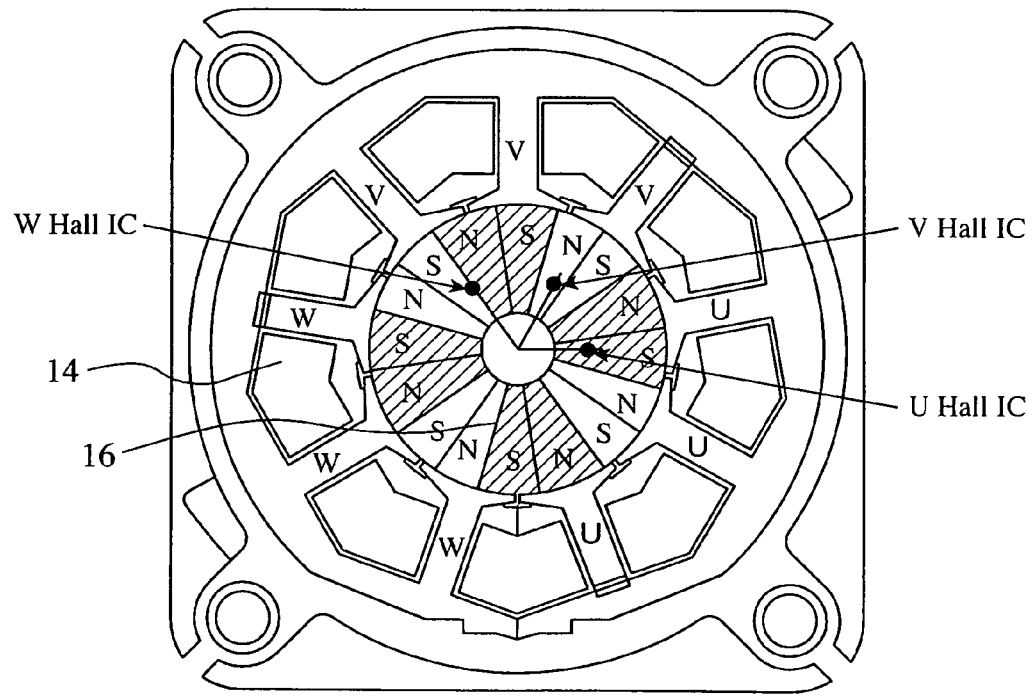
 Hatched Portion Indicates N Pole of Rotor

FIG. 4

| Magnet | Mechaninal Angle $\theta 1$ (Electrical Angle 360) | Minimum Angles of Installed Hall ICs (Mechaninal Angle=$\theta 1/3$) | General Angles of Installed Hall ICs | n In The Example of FIG. 3 |
|---|---|---|---|---|
| 16-POLE | $\theta 1=45°$ | 15° $\begin{cases} \theta_{u0}=0 \\ \theta_{v0}=15 \\ \theta_{w0}=30 \end{cases}$ | $\begin{cases} \theta_{un}=\theta_{u0}+45n \\ \theta_{vn}=\theta_{v0}+45n \\ \theta_{wn}=\theta_{w0}+45n \end{cases}$ | u n=0<br>v n=1<br>w n=2 |
| 8-POLE | $\theta 1=90°$ | 30° $\begin{cases} \theta_{u0}=0 \\ \theta_{v0}=30 \\ \theta_{w0}=60 \end{cases}$ | $\begin{cases} \theta_{un}=\theta_{u0}+90n \\ \theta_{vn}=\theta_{v0}+90n \\ \theta_{wn}=\theta_{w0}+90n \end{cases}$ | u n=0<br>v n=1<br>w n=0 |

FIG. 6

(a) 16-POLE MAGNET

| | Output of Hall IC | | | Electrical Angle | Mechaninal Angl | Current Supply Direction | |
|---|---|---|---|---|---|---|---|
| | U | V | W | Degrees | Degrees | Opening Direction | Closing Direction |
| (1) | H | L | H | 0 | 0 | V→U | U→V |
| (2) | H | L | L | 30 | 7.5 | | |
| (3) | H | H | L | 60 | 15 | W→U | U→W |
| (4) | L | H | L | 90 | 23 | | |
| (5) | L | H | H | 120 | 30 | W→V | V→W |
| (6) | L | L | H | 150 | 38 | | |
| (7) | H | L | H | 180 | 45 | U→V | V→U |
| (8) | H | L | L | 210 | 53 | | |
| (9) | H | H | L | 240 | 60 | U→W | W→U |
| (10) | L | H | L | 270 | 68 | | |
| (11) | L | H | H | 300 | 75 | V→W | W→V |
| (12) | L | L | H | 330 | 83 | | |

{ (1)–(6) } A
{ (7)–(12) } B (b) 8-POLE MAGNET

| | Output of Hall IC | | | Electrical Angle | Mechaninal Angl | Current Supply Direction | |
|---|---|---|---|---|---|---|---|
| | U | V | W | Degrees | Degrees | Opening Direction | Closing Direction |
| (1) | H | L | H | 0 | 0 | V→U | U→V |
| (2) | H | L | L | 60 | 15 | W→U | U→W |
| (3) | H | H | L | 120 | 30 | W→V | V→W |
| (4) | L | H | L | 180 | 45 | U→V | V→U |
| (5) | L | H | H | 240 | 60 | U→W | W→U |
| (6) | L | L | H | 300 | 75 | V→W | W→V |

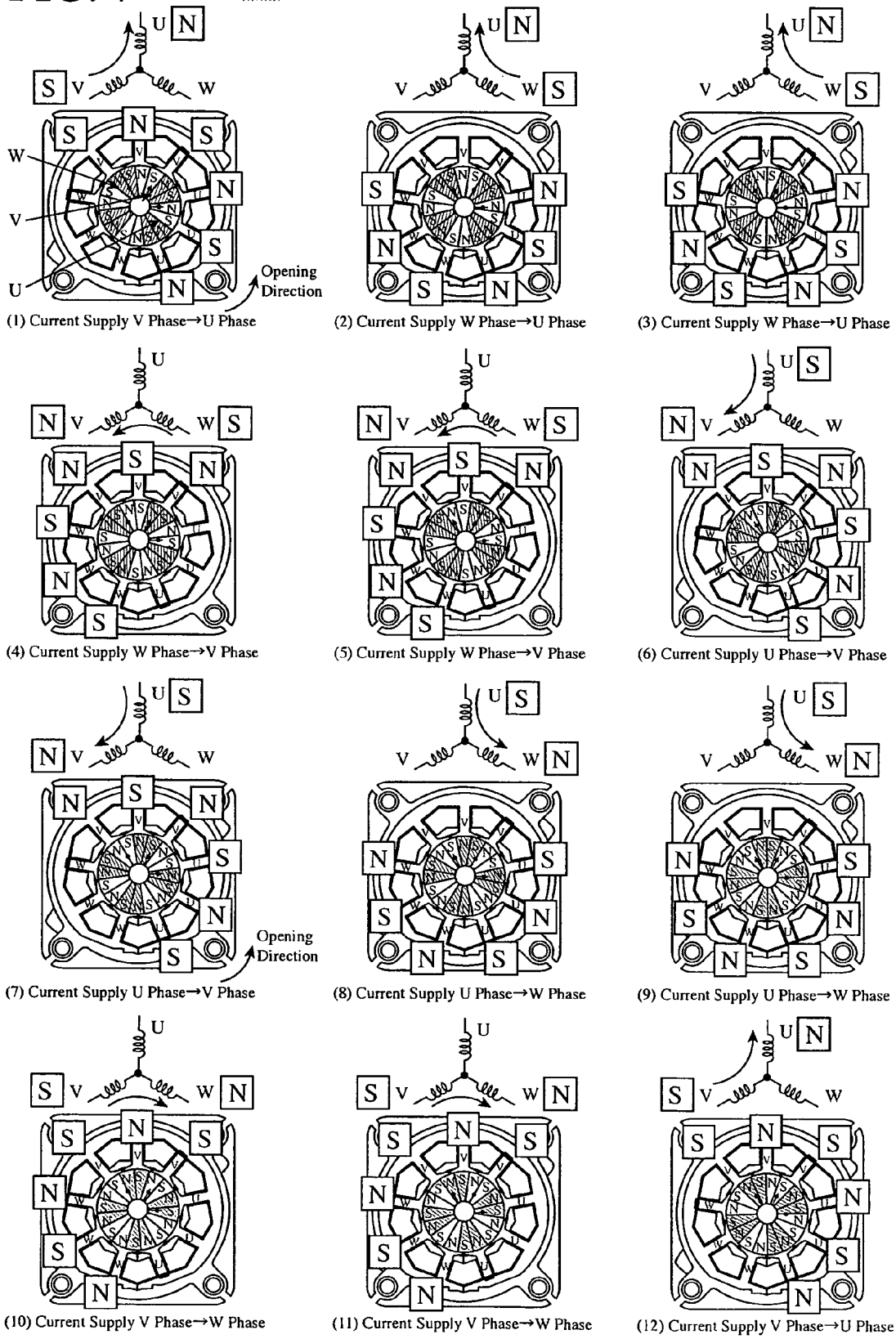

FIG. 7 — Hatched Portion Indicates N Pole of Rotor (1) Current Supply V Phase→U Phase
(2) Current Supply W Phase→U Phase
(3) Current Supply W Phase→U Phase
(4) Current Supply W Phase→V Phase
(5) Current Supply W Phase→V Phase
(6) Current Supply U Phase→V Phase
(7) Current Supply U Phase→V Phase
(8) Current Supply U Phase→W Phase
(9) Current Supply U Phase→W Phase
(10) Current Supply V Phase→W Phase
(11) Current Supply V Phase→W Phase
(12) Current Supply V Phase→U Phase

| Electrical Angle | Mechanical Angle | Current Supply Direction | |
|---|---|---|---|
| Degrees | Degrees | Opening Direction | Closing Direction |
| 0 | 0 | V→U | U→V |
| 30 | 7.5 | VW→U | U→VW |
| 60 | 15 | W→U | U→W |
| 90 | 23 | W→UV | UV→W |
| 120 | 30 | W→V | V→W |
| 150 | 38 | UW→V | V→UW |
| 180 | 45 | U→V | V→U |
| 210 | 53 | U→VW | VW→U |
| 240 | 60 | U→W | W→U |
| 270 | 68 | UV→W | W→UV |
| 300 | 75 | V→W | W→V |
| 330 | 83 | V→UW | UW→V |

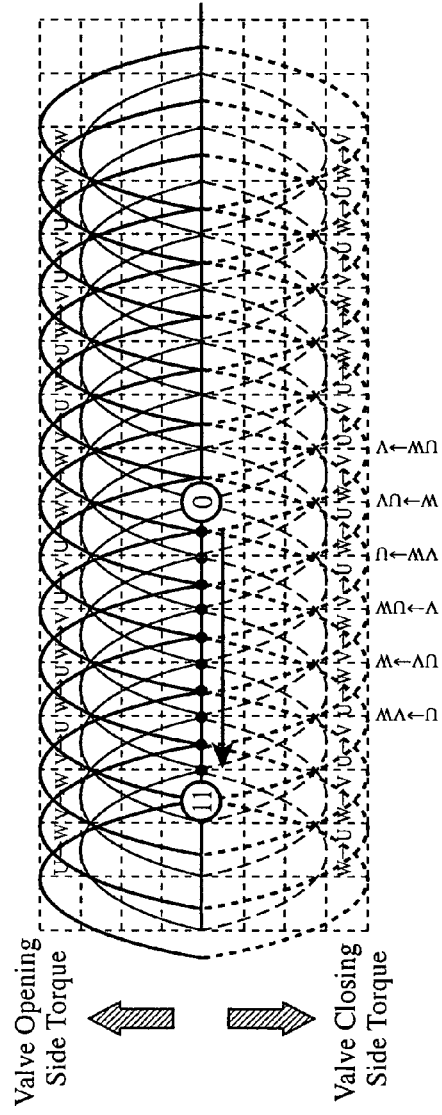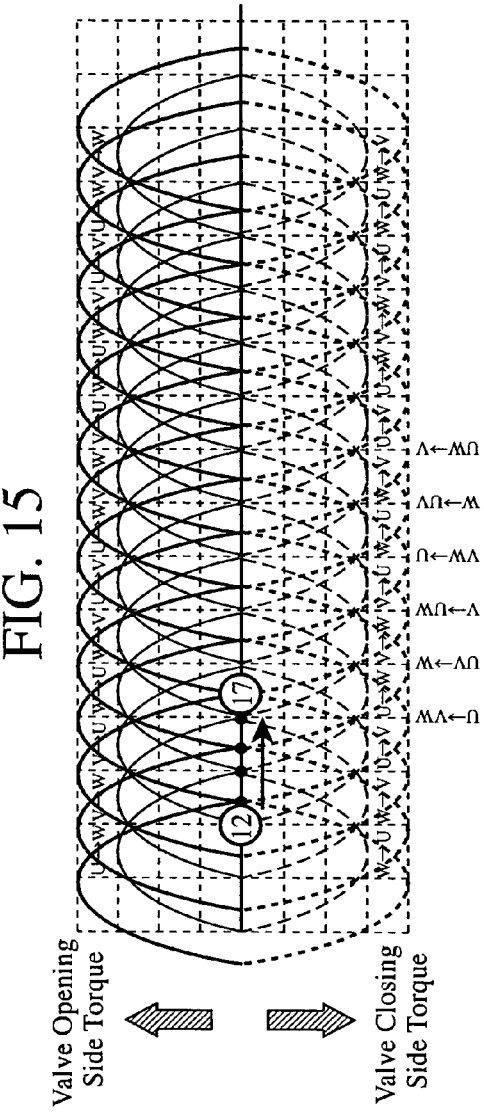

FIG. 17
(a)
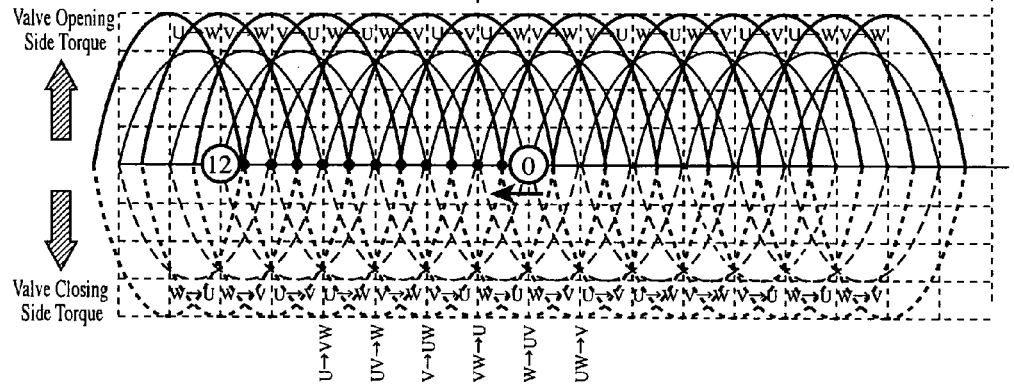
B : Position of Motor Stopper
(b) Excitation of V→UV Is Unstable Point At Position B, Causing Motor Shaft to Move in Direction of the Arrow→
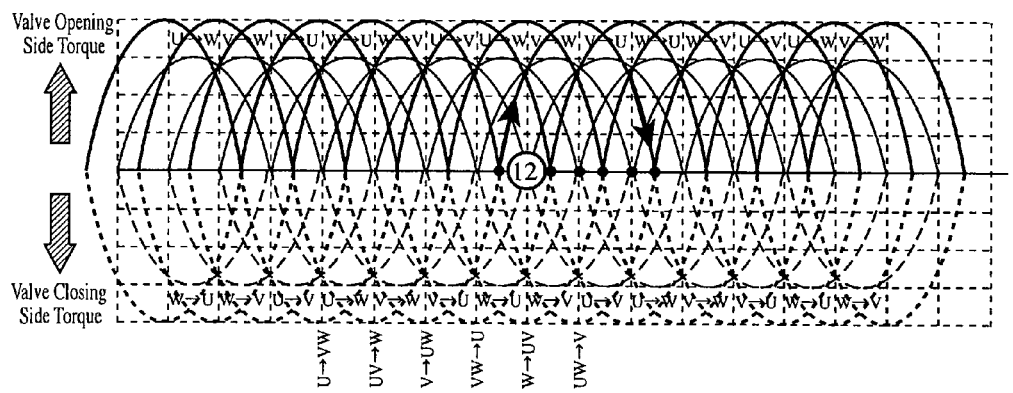
(c)
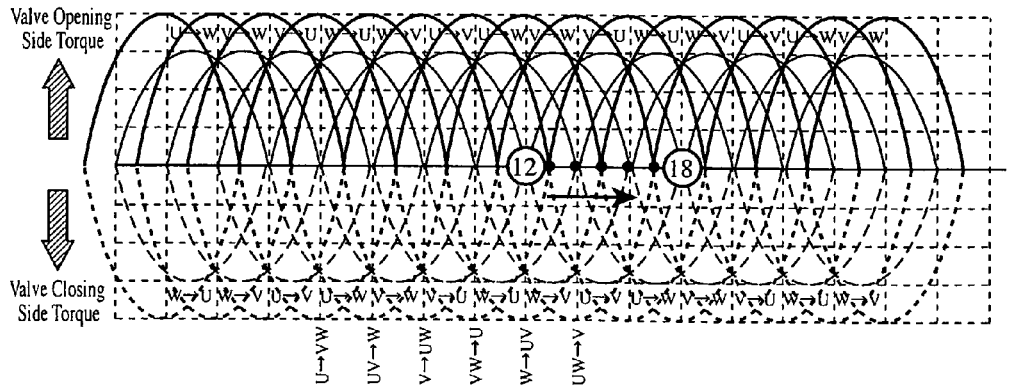

FIG. 18
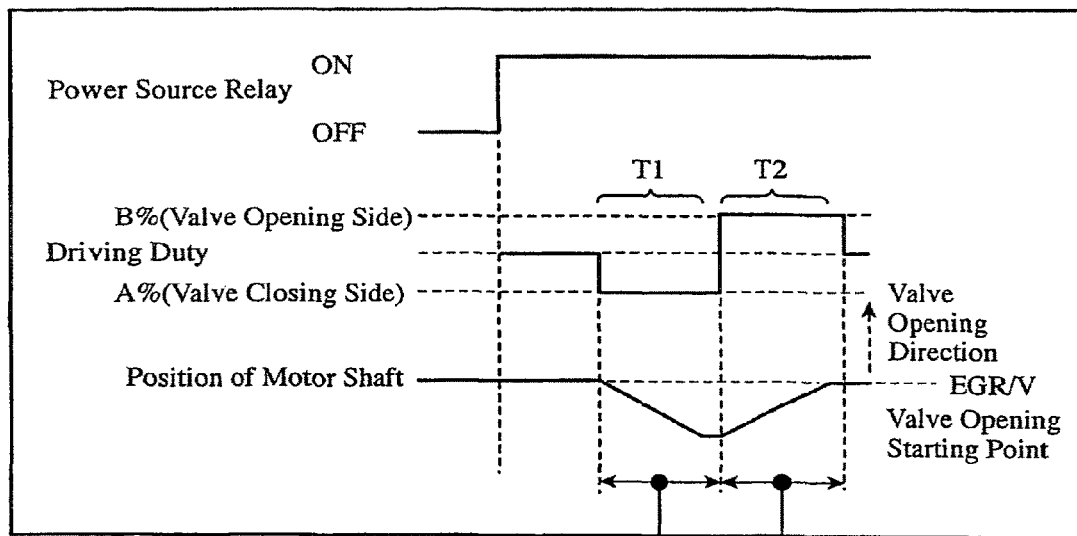
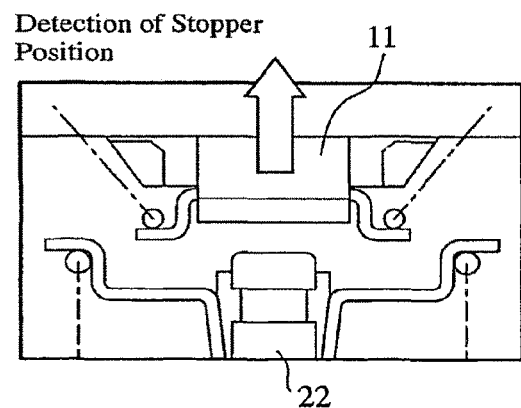
Detection of Stopper Position
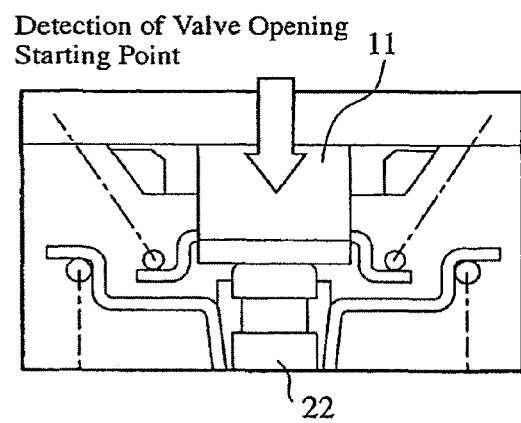
Detection of Valve Opening Starting Point

BRUSHLESS MOTOR APPARATUS

TECHNICAL FIELD

The present invention relates to a brushless motor apparatus operated by direct currents, and more particularly to a technology for reducing the mechanical vibration of a brushless motor apparatus.

BACKGROUND ART

Conventionally, a brushless motor apparatus is used as the driving source of an on-vehicle EGR (Exhaust Gas Recirculation) valve or an actuator for exhaust emission control such as a VG (Variable Geometric) turbo actuator, for example. The brushless motor apparatus includes, for example, a stator where the number of its slots is "9," a rotor where the number of its poles is "8," a magnetic-pole-position detecting magnet where the number of its poles is the same as that of the rotor "8," and a Hall element detecting the rotational position of the rotor by detecting the magnetism of the magnetic-pole-position detecting magnet.

In recent years, a brushless motor apparatus where the number of poles of the magnetic-pole-position detecting magnet is "16" that is twice as large as that of a conventional detecting magnet has been developed in order to increase the resolution in the detection of the rotational position of the rotor (see Patent Document 1, for example). The brushless motor apparatus can double the accuracy with which a conventional brushless motor apparatus detects the rotational position of the rotor.

Patent Document 1: JP-A-2002-252958

In the brushless motor apparatus disclosed in Patent Document 1 described above, it is required to first detect the phase of the rotor upon actuation of a power source. The phase detection is done by giving current supply patterns sequentially to the stator at a fixed duty cycle to switch excitation patterns in sequence; however, when the rotor rotates by those excitation patterns and stops at stabilization points according to the excitation patterns, mechanical vibration is caused in the time elapsing before the rotor rests at a stabilization point. Since the engine is not yet usually started upon actuation of the power source, the surroundings are very quiet. Therefore, there occurs a problem that the mechanical vibration caused by the rotation of the rotor is transferred to the shaft or other linkage mechanisms to cause the reverberating sounds to grate on the ear.

Further, since the number of poles of the magnetic-pole-position detecting magnet is increased twice as large as that of conventional one, even if, as shown in FIG. 6(a), the state of the output patterns of three Hall ICs (an IC into which Hall elements are built) arranged so as to be opposed to the magnetic-pole-position detecting magnet completes a full circle, the amount of travel of the rotor (the amount of rotation of the rotor) brought by the excitation patterns is half that of the conventional detecting magnet. For this reason, it is required to judge whether the state of the output patterns of the Hall ICs assuming the present position belongs to area A or area B. If the present position thereof is judged to exist in area B in spite of the fact that the position actually exists in area A, there occurs a problem such that the direction where the rotor is to be rotated may be opposite from an intended direction.

The present invention has been made to solve the above-mentioned problems, and an object of the present invention is to provide a brushless motor apparatus where the generation of sound grating on the ear occurring upon actuation of the power source can be reduced, and the rotation of the rotor in the direction opposite from the intended one can be prevented.

DISCLOSURE OF THE INVENTION

In order to solve the above-described problems, the brushless motor apparatus according to the present invention includes: a fixedly arranged stator; a rotor to be rotated such that the stator is sequentially excited by a plurality of excitation patterns; a magnetic-pole-position detecting magnet fixed to the rotor and having twice the number of poles of the rotor; and a position detecting element arranged opposite to the magnetic-pole-position detecting magnet and detecting the position of magnetic poles of the rotor; and further includes a motor drive circuit making a control such that when the stator is excited with a different excitation pattern between regular excitation patterns employed for normal operation at the time of phase matching carried out upon actuation of a power source, the rotation angle of the rotor is one-half the rotation angle corresponding to the regular excitation pattern.

According to the brushless motor apparatus according to the present invention, it is controlled such that at the time of the phase matching carried out on actuation of the power source, when the stator is excited with the different excitation pattern between the regular excitation patterns employed for the normal operation, the rotation angle of the rotor is one-half the rotation angle corresponding to the regular excitation pattern, to thus reduce the mechanical vibration of the rotor. As a result, the generation of a jarring sound upon actuation of the power source can be reduced.

BRIEF DESCRIPTION OF THE DRAWINGS

FIG. 2 is a diagram showing the amount of lift of valve-number of counts of Hall IC characteristic of the brushless motor apparatus in accordance with the first embodiment of the present invention.

FIG. 3 is a view of the brushless motor apparatus in accordance with the first embodiment of the present invention, viewed from the top face thereof.

FIG. 4 is a diagram showing the disposition of Hall ICs in the brushless motor apparatus in accordance with the first embodiment of the present invention in comparison with the case where a magnetic-pole-position detecting magnet having eight poles is used.

FIG. 6 is a diagram showing the relation between the current supply direction, the electrical angle, the mechanical angle, and the output of Hall IC, used for operating the brushless motor apparatus in accordance with the first embodiment of the present invention.

FIG. 7 is a view showing the current supply sequence and the torque point of the rotor in each of energizations when the rotor is rotated in the opening direction in the brushless motor apparatus in accordance with the first embodiment of the present invention.

FIG. 14 is a diagram showing the torque curve at the time of 12-step operation in the phase matching operation performed in the brushless motor apparatus in accordance with the first embodiment of the present invention.

FIG. 15 is a diagram showing the torque curve at the time of 6-step operation in the phase matching operation performed in the brushless motor apparatus in accordance with the first embodiment of the present invention.

FIG. 17 is a diagram showing the torque curve when the motor stopper is positioned at B in the phase matching operation performed in the brushless motor apparatus in accordance with the first embodiment of the present invention.

FIG. 18 is a diagram showing the taking-in operation and the extruding operation in the initialization operation performed in the brushless motor apparatus in accordance with the first embodiment of the present invention.

BEST MODE FOR CARRYING OUT THE INVENTION

Embodiments of the present invention will now be described with reference to the accompanying drawings in order to explain the present invention in more detail.

First Embodiment

Figure 1:
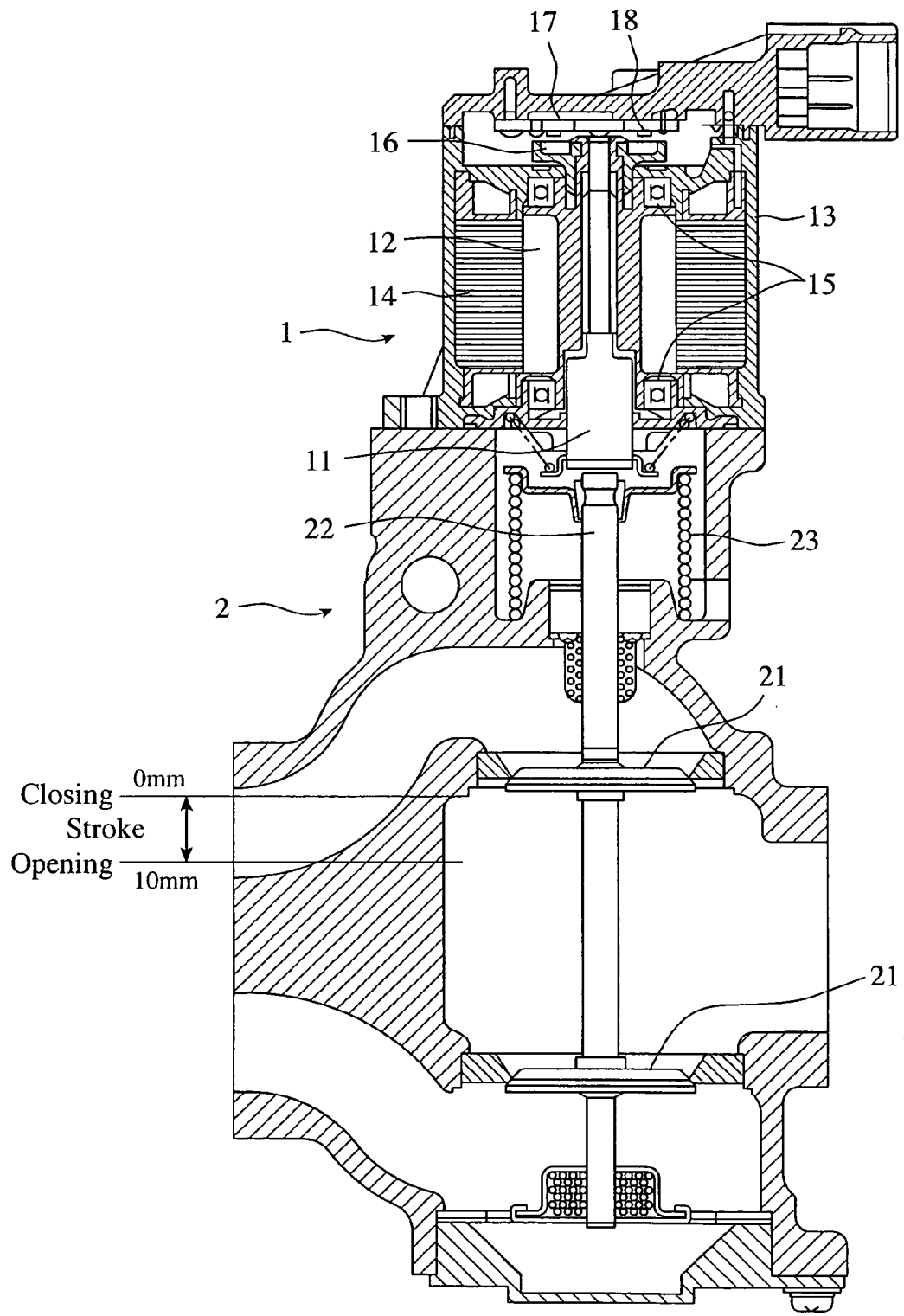
FIG. 1 is a sectional view of the structure of an EGR valve where a brushless motor apparatus in accordance with the first embodiment of the present invention is applied, viewed in the axial direction thereof.

FIG. 1 is a sectional view of the structure of an EGR valve where a brushless motor apparatus in accordance with the first embodiment of the present invention is applied, as is sectioned along the axial direction thereof. The EGR valve is composed of a brushless motor apparatus 1 and a valve mechanism 2 serving as its main portions. The brushless motor apparatus 1 is constructed in such a manner that a cylindrical rotor 12 screwed to a motor shaft 11 is inserted in the hollow of a stator 14 secured to a case 13, and that the rotor is rotatably supported by a bearing 15. Further, the rotor 12 has a magnetic-pole-position detecting magnet 16 secured thereto so as to form a plane perpendicular to the shaft thereof.

Moreover, a Hall IC 18 is mounted on a printed board 17. The Hall IC 18 is opposed to a position detecting element according to the present invention, and is composed of integrated circuits (ICs) into which Hall elements are built. The printed board 17 is attached to the case 13 such that the Hall IC 18 is located in a position opposed to the magnetic-pole-position detecting magnet 16. The motor shaft 11 to which the rotor 12 is screwed is movable in the axial direction (vertically in FIG. 1) move by the rotation of the rotor 12, and the motor shaft 11 and the rotor 12 are provided with a screw such that the amount of travel of the motor shaft 11 for each rotation of the rotor 12 is 8 mm.

The valve mechanism 2 is provided with a valve shaft 22 where a valve 21 is fixed, and the valve shaft is disposed such that the axis thereof is coincident with that of the motor shaft 11. The valve shaft 22 is urged in the direction where the valve 21 is closed (hereinlater referred to as "the valve closing direction") by a return spring 23 in order to serve a fail safe function. The valve shaft 22 is arranged to be able to axially (in the direction indicated by the arrow shown therein) move by virtue of the motor shaft 11 abutting against one end of the valve shaft. The stroke of the valve shaft 22 is 10 mm, and it is arranged that the travel distance be 0 mm when the valve 21 is closed and be 10 mm when the valve 21 is opened to the maximum.

FIG. 2 shows the amount of lift of valve versus the characteristics of the number of counts of Hall IC thereof. The amount of lift of the valve representing the amount of travel of the valve 21 is proportional to the number of counts of the Hall IC representing the number of changes of the output pattern of the Hall IC 18; Assuming that the number of counts of the Hall IC immediately after the motor shaft 11 abutted against the valve shaft 22, that is, the number of counts thereof in the state where the amount of lift of the valve is 0 mm, is set to zero, the amount of lift of the valve is arranged to be maximum 10 mm when the number of counts of the Hall IC is 60. Therefore, the lift of the valve in an amount of 0.167 mm corresponds to 1 count of the Hall IC.

FIG. 3 is a view of the brushless motor apparatus 1 viewed from the top face thereof. The number of slots of the stator 14 of the brushless motor apparatus 1 is "9," the number of poles of the rotor 12 is "8," and the number of poles of the magnetic-pole-position detecting magnet 16 is "16." The magnetic-pole-position detecting magnet 16 is arranged such that a pair of NS poles thereof correspond to one pole of the rotor 12. Referring to FIG. 3, a pair of hatched NS poles correspond to the N pole of the rotor 12, and a pair of not-hatched NS poles correspond to the S pole of the rotor 12.

Summarizing the above,
The amount of travel of the motor shaft 11 per rotation of the rotor 12: 8 mm,
The number of rotation of the motor shaft 11 required for the shaft to travel by 10 mm: 1.25,
The number of steps of the rotor 12 per rotation thereof: 24 (the angular resolution: 15 degrees),
The number of poles of the magnetic-pole-position detecting magnet 16: 16,
The number of steps of the magnetic-pole-position detecting magnet 16 per rotation thereof: 48 (the angular resolution: 7.5 degrees), and The number of steps thereof required for the motor shaft to travel by 10 mm: 60.

As shown in FIG. 3, the Hall IC 18 arranged to be opposed to the magnetic-pole-position detecting magnet 16 is composed of three Hall ICs, a U Hall IC, a V Hall IC, and a W Hall IC. FIG. 4 is a diagram showing the disposition of the Hall IC 18 in comparison with the case where a conventional 8-pole magnetic-pole-position detecting magnet is used. It is arranged that the U Hall IC, V Hall IC, and W Hall IC corresponding to the U phase, V phase, and W phase, respectively, be equiangularly spaced (120° in the electric angle) within a pair of NS poles (360° in the electric angle), and three states exist within one cycle of the pair of NS poles (45° in the mechanical angle, 360° in the electric angle). The Hall IC 18 plays the role of a brush in a DC motor.

Figure 5:
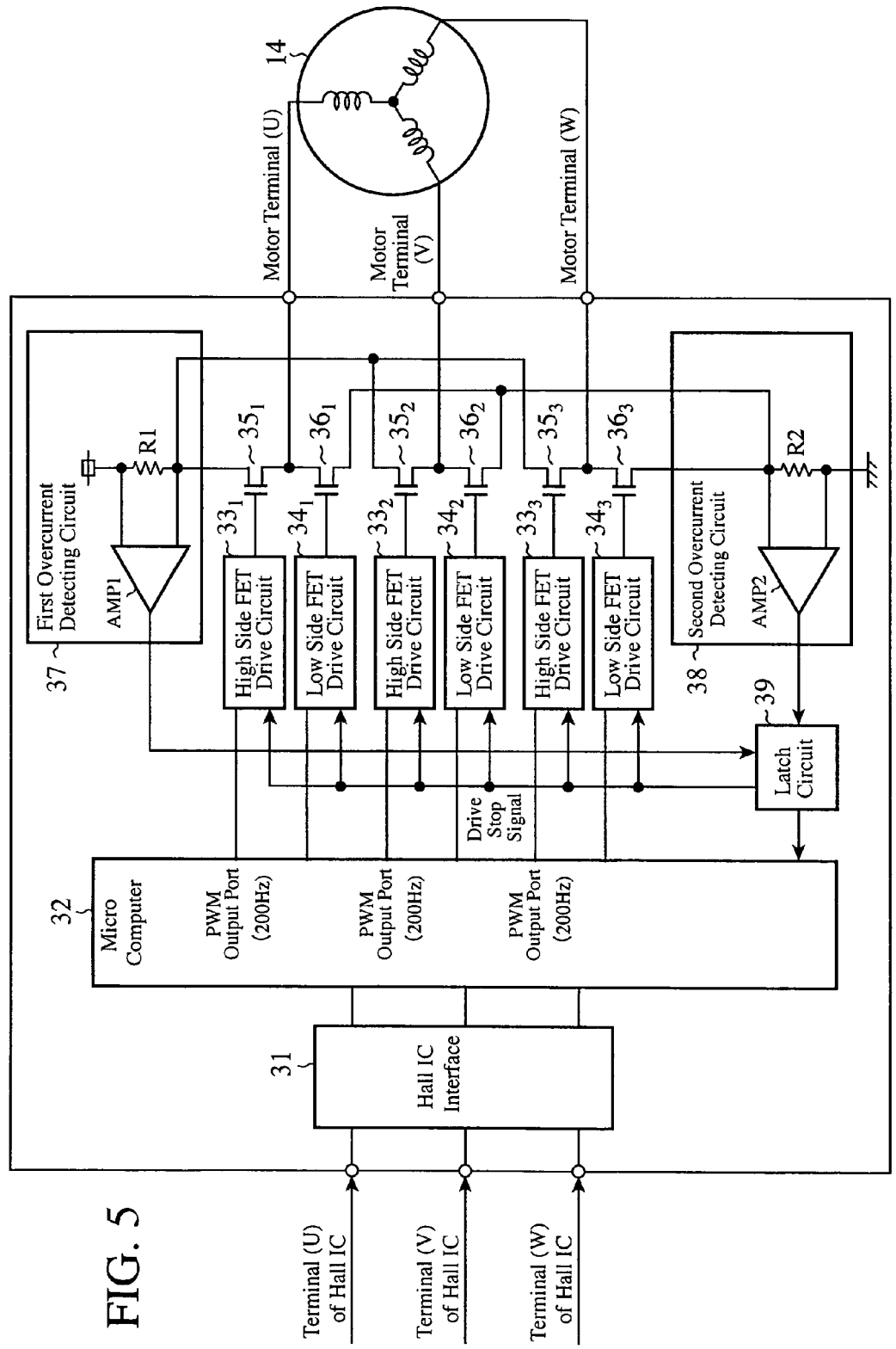
FIG. 5 is a block diagram showing the configuration of a motor driving circuit used in the brushless motor apparatus in accordance with the first embodiment of the present invention.

FIG. 5 is a block diagram showing the configuration of a motor driving circuit used in the brushless motor apparatus 1. The motor driving circuit is mounted on a controller (not shown), for example, separated from the main body thereof. The motor driving circuit consists of a Hall IC interface 31, a microcomputer (hereinafter, abbreviated to "micon") 32, high side FET drive circuits $33_1$-$33_3$, low side FET drive circuits $34_1$-$34_3$, high side FETs $35_1$-$35_3$, low side FETs $36_1$-$36_3$, a first overcurrent detecting circuit 37, a second overcurrent detecting circuit 38, and a latch circuit 39.

The Hall IC interface 31 receives a signal sent from the U Hall IC constituting the Hall IC 18 through a Hall IC terminal (U), a signal sent from the V Hall IC through a Hall IC terminal (V), and a signal sent from the W Hall IC through a Hall IC terminal (W), and sends the signals to the microcomputer 32 after performing a predetermined amplification and the like.

The microcomputer 32 produces motor control signals, based on the signals sent from the Hall IC interface 31, and sends the signals from PWM output ports to the high side FET drive circuits $33_1$-$33_3$ and the low side FET drive circuits $34_1$-$34_3$. Moreover, when receiving a drive stop signal sent from the latch circuit 39, the microcomputer 32 stops producing the motor control signal.

When the drive stop signal has not been sent thereto from the latch circuit 39, the high side FET drive circuits $33_1$-$33_3$ produce drive signals, based on the motor control signals sent from the microcomputer 32, and send the signals to the gates of the high side FETs $35_1$-$35_3$, respectively. The high side FETs $35_1$-$35_3$ are turned on according to the driving signals sent from the high side FET drive circuits $33_1$-$33_3$ with predetermined timing, and send the current sent from a power source via a resistor R1 of the first overcurrent detecting circuit 37 to the winding of the stator 14 by way of a motor terminal (U), a motor terminal (V), or a motor terminal (W), respectively.

The low side FETs drive circuits $34_1$-$34_3$, when the drive stop signal has not been sent thereto from the latch circuit 39, produce drive signals, based on the motor control signals sent from the microcomputer 32, and send the signals to the gates of the low side FETs $36_1$-$36_3$, respectively. The low side FETs $36_1$-$36_3$ are turned on according to the driving signals sent from the low side FET drive circuits $34_1$-$34_3$ with a predetermined timing, and pass the current sent from the winding of the stator 14 through the motor terminal (U), the motor terminal (V) or the motor terminal (W), respectively, to the ground via a resistor R2 of the second overcurrent detecting circuit 38.

The first overcurrent detecting circuit 37 is composed of the resistor R1 and an operational amplifier AMP1 detecting the voltage across the resistor R1, and the detecting circuit, when detecting that the current flowing from the power source to the winding of the stator 14 through the high side FETs $35_1$-$35_3$ exceeded a predetermined value, produces an overcurrent signal showing that an overcurrent is detected, and sends the signal to the latch circuit 39. The second overcurrent detecting circuit 38 consists of the resistor R2 and an operational amplifier AMP2 detecting the voltage across the resistor R2, and the detecting circuit, when detecting that the current flowing from the winding of the stator 14 to the ground through the low side FETs $36_1$-$36_3$ is a predetermined value or more, sends an overcurrent signal showing that an overcurrent is detected to the latch circuit 39.

The latch circuit 39 latches the overcurrent signals sent from the first overcurrent detecting circuit 37 and the second overcurrent detecting circuit 38, sends the signals to the high side FET drive circuits $33_1$-$33_3$ and the low side FET drive circuits $34_1$-$34_3$ as drive stop signals, and at the same time, sends the signals to the microcomputer 32. Thereby, the production of the drive signal in the high side FET drive circuits $33_1$-$33_3$ and the low side FET drive circuits $34_1$-$34_3$ is stopped, and simultaneously, the production of the motor control signal carried out by the microcomputer 32 is stopped.

In thus arranged motor driving circuit, when the current supply direction is V→U, the high side FET $35_2$ and the low side FET $36_1$ are turned on. Thus, the current flows by the route of the power source→the first overcurrent detecting circuit→the high side FET $35_2$→the motor terminal (V)→the winding of the stator 14→the motor terminal (U)→the low side FET $36_1$→the second overcurrent detecting circuit 38→the ground. When the current supply direction is W→U, the high side FET $35_3$ and the low side FET $36_1$ are turned on. In this way, the current flows by the route of the power source→the first overcurrent detecting circuit 37→the high side FET $35_3$→the motor terminal (W)→the winding of the stator 14→the motor terminal (U)→the low side FET $36_1$→the second overcurrent detecting circuit 38→the ground.

When the current supply direction is W→V, the high side FET $35_3$ and the low side FET $36_2$ are turned on. Thus, the current flows by the route of the power source→the first overcurrent detecting circuit 37→the high side FET $35_3$→the motor terminal (W)→the winding of the stator 14→the motor terminal (V)→the low side FET $36_2$→the second overcurrent detecting circuit 38→the ground. When the current supply direction is U→V, the high side FET $35_1$ and the low side FET $36_2$ are turned on. In this way, the current flows by the route of the power source→the first overcurrent detecting circuit 37→the high side FET $35_1$→the motor terminal (U)→the winding of the stator 14→the motor terminal (V) →the low side FET $36_2$→the second overcurrent detecting circuit 38→the ground.

When the current supply direction is U→W, the high side FET $35_1$ and the low side FET $36_3$ are turned on. Thus, the current flows by the route of the power source→the first overcurrent detecting circuit 37→the high side FET $35_1$→the motor terminal (U)→the winding of the stator 14→the motor terminal (W)→the low side FET $36_3$→the second overcurrent detecting circuit 38→the ground. When the current supply direction is V→W, the high side FET $35_2$ and the low side FET $36_3$ are turned on. In this way, the current flows by the route of the power source→the first overcurrent detecting circuit 37→the high side FET $35_2$→the motor terminal (V)→the winding the stator 14→the motor terminal (W)→the low side FET $36_3$→the second overcurrent detecting circuit 38→the ground.

FIG. 6(a) is a diagram showing the relation between the current supply direction, the electrical angle, the mechanical angle, and the output of the Hall IC 18 when normal operation is carried out. When the rotor 12 is rotated in the opening direction of the valve 21 (referred to as "the valve opening direction" hereinlater), energizing each of the windings of U phase, V phase, and W phase of the stator 14 is repeated in order V→U, W→U, W→V, U→V, U→W, and V→W. Meanwhile, when the rotor 12 is rotated in the valve closing direction, energizing each of the windings of U phase, V phase, and W phase of the stator 14 is repeated in order U→V, U→W, V→W, V→U, W→U, and W→V. Those current supply patterns are called "Regular current supply patterns," and the exciting patterns exciting the stator 14 with those regular current supply patterns are called "Regular exciting patterns."

For comparison, FIG. 6(*b*) shows the relation between the current supply direction, the electrical angle, the mechanical angle, and the output of the Hall IC when normal operation is carried out in the case of the magnetic-pole-position detecting magnet having 8 poles. When the magnetic-pole-position detecting magnet has 16 poles, the Hall IC 18 has two output patterns with respect to one current supply direction. Therefore, since the same output pattern appears from the Hall IC 18 in area A where the current supply direction in the opening direction is V→U, W→U, and W→V (the current supply direction in the closing direction is U→V, U→W, and V→W.) and area B where the current supply direction in the opening direction is U→V, U→W, and V→W (the current supply direction in the closing direction is V→U, W→U, and W→V), it is necessary to distinguish between those output patterns when the brushless motor apparatus 1 is started (a detailed explanation thereof will be given later).

Figure 8:
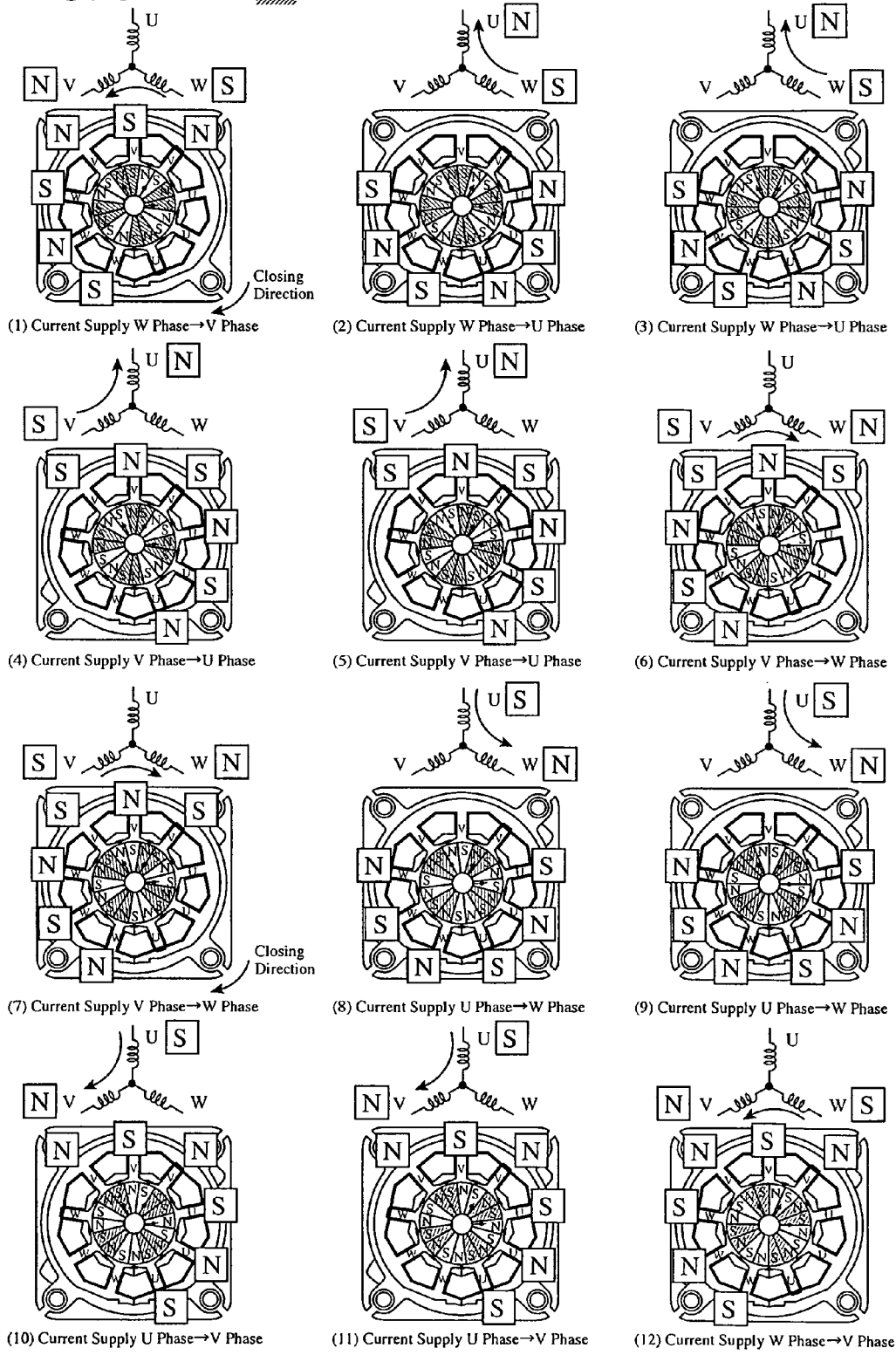
FIG. 8 is a view showing the current supply sequence and the torque point of the rotor in each of energizations when the rotor is rotated in the closing direction in the brushless motor apparatus in accordance with the first embodiment of the present invention.

FIG. 7 is a view showing the current supply sequence when the rotor 12 is rotated in the valve opening direction with the regular current supply patterns and the torque point of the rotor 12 in each of energizations. Specifically, it is necessary to switch the current supply patterns in order of FIGS. 1-12 in parentheses shown therein in order to advance the rotor 12. FIG. 8 is a view showing the current supply sequence when the rotor 12 is rotated in the valve closing direction with the regular current supply patterns and the torque point of the rotor 12 in each of energizations. Specifically, it is required to switch the current supply patterns in order of numbers 1-12 in parentheses shown in the figure in order to advance the rotor 12.

Figure 9:
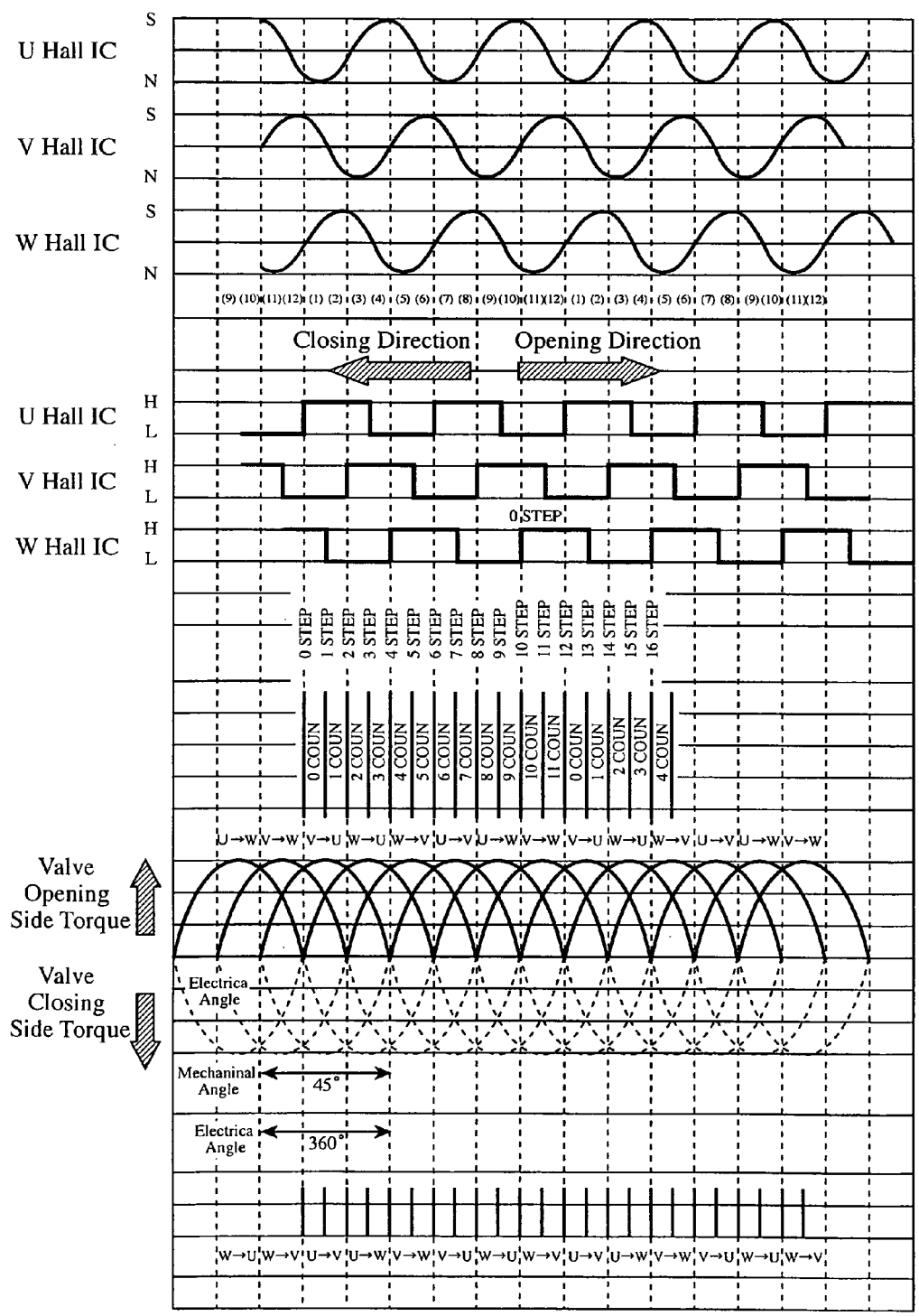
FIG. 9 is a diagram showing the state where the output of the Hall IC is sequentially switched and the state where the torque curve varies in the brushless motor apparatus in accordance with the first embodiment of the present invention.

FIG. 9 is a diagram showing the state where the logical values of the signals outputted from the Hall IC 18 by virtue of the magnetic-pole-position detecting magnet 16 rotating together with the rotor 12 are sequentially switched, and the sate where the torque curve varies at that time.

The operation of the initialization performed upon actuation of a power source will next be described. A throttle valve and other actuators usually have mounted thereon an absolute-value sensor directly measuring the movement of the valve. In contrast, the EGR valve to which the brushless motor apparatus in accordance with the first embodiment is applied does not have any absolute-value sensor mounted thereon for cost reduction. For this reason, in the EGR valve, an operation called "Initialization" for finding the control original point of the valve 21 is done upon actuation of the power source. Thereafter, the output pattern of the Hall IC 18 for detecting the position of magnetic pole of the rotor 12 is counted by the microcomputer 32 with reference to the control original point obtained by the initialization, and the opening and closing of the valve 21 is controlled.

Figures 10, 11:
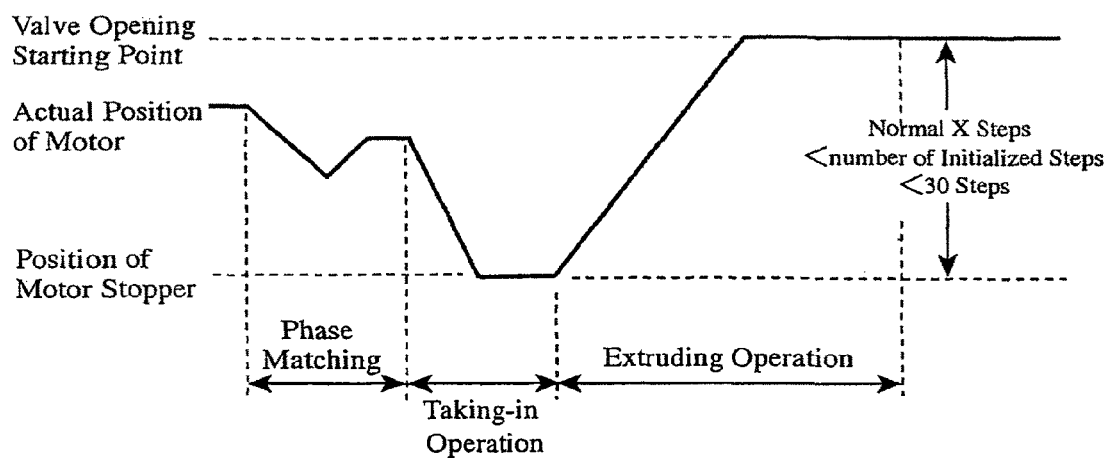
FIG. 10 is a diagram showing the outline of the initialization operation performed in the brushless motor apparatus in accordance with the first embodiment of the present invention.
FIG. 11 is a diagram showing the current supply patterns in the phase matching of the initialization operation performed in the brushless motor apparatus in accordance with the first embodiment of the present invention.

In initialization, as shown in FIG. 10, three operations "Phase matching," "Taking-in operation," and "Extruding operation" are performed in sequence. Referring to FIG. 10, the position of the motor stopper is that where the motor shaft 11 is moved in the valve closing direction, abuts against the casing, and becomes unable to be moved. Further, the valve-opening starting point corresponds to the position immediately after the motor shaft 11 is moved toward the valve opening direction to be abutted against the valve shaft 22, and the point becomes the control original one.

Operation of "Phase matching" will be first explained. When the number of poles of the magnetic-pole-position detecting magnet 16 is twice that of the rotor 12, as shown in FIG. 6(*a*), there are two same output patterns of the Hall IC 18 within one cycle)(360° of the electrical angle, which makes it impossible to know whether the position of magnetic pole of the rotor 12 exists in area A or area B. Therefore, the following operation of phase matching is carried out before performing the taking-in operation. In that case, the following conditions (1-1) to (1-3) are preconditions therefor.

(1-1) Energization to the stator 14 is switched at a speed of 8 ms/step, irrespective of the output pattern of the Hall IC 18.

(1-2) When energization, the rotor 12 performs a so-called stepping operation, which does not stop at the torque point but stops at the stability point. Here, when a certain energization is done, the position three steps ahead of the torque point becomes a stability point for the rotor 12.

(1-3) In performing 12-step operation and 6-step operation (as will hereinafter be described in detail), a special energization is done to reduce the noise caused by the stepping operation. Specifically, the current supply patterns as shown in FIG. 11 is given to the stator 14. In FIG. 11, for instance, when the current supply direction is in the opening direction and the electrical angle is 30°, a current supply pattern of VW→U is given to the stator 14. In this manner, the high side FET 35$_2$ and high side FET 35$_3$, and the low side FET 36$_1$ of the motor driving circuit are turned on, and current can be flown from both the windings of V phase and W phase to the winding of U phase.

Figure 12:
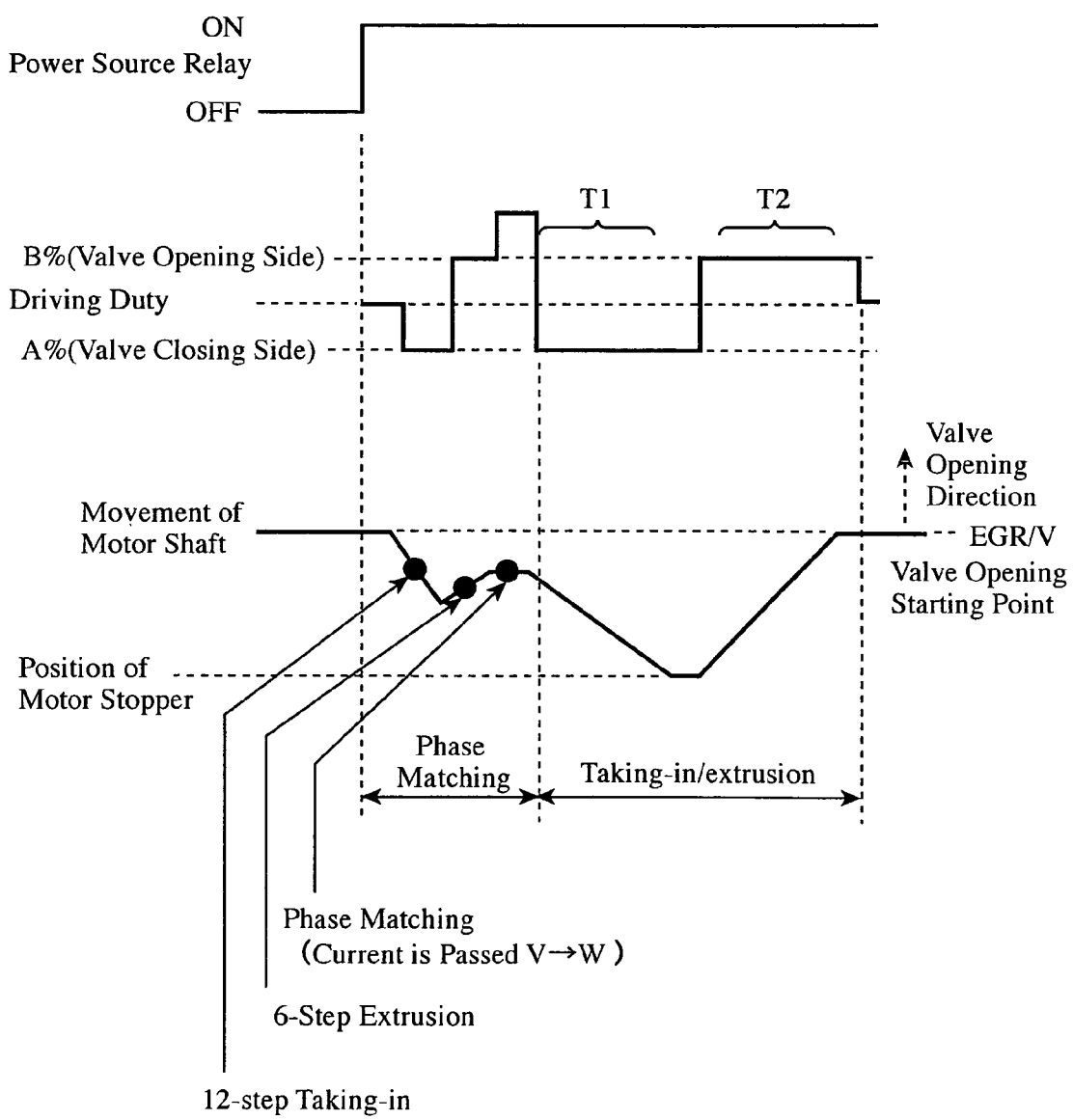
FIG. 12 is a diagram showing the movement of the motor shaft at the time of the phase matching performed in the brushless motor apparatus in accordance with the first embodiment of the present invention.
Figure 13:
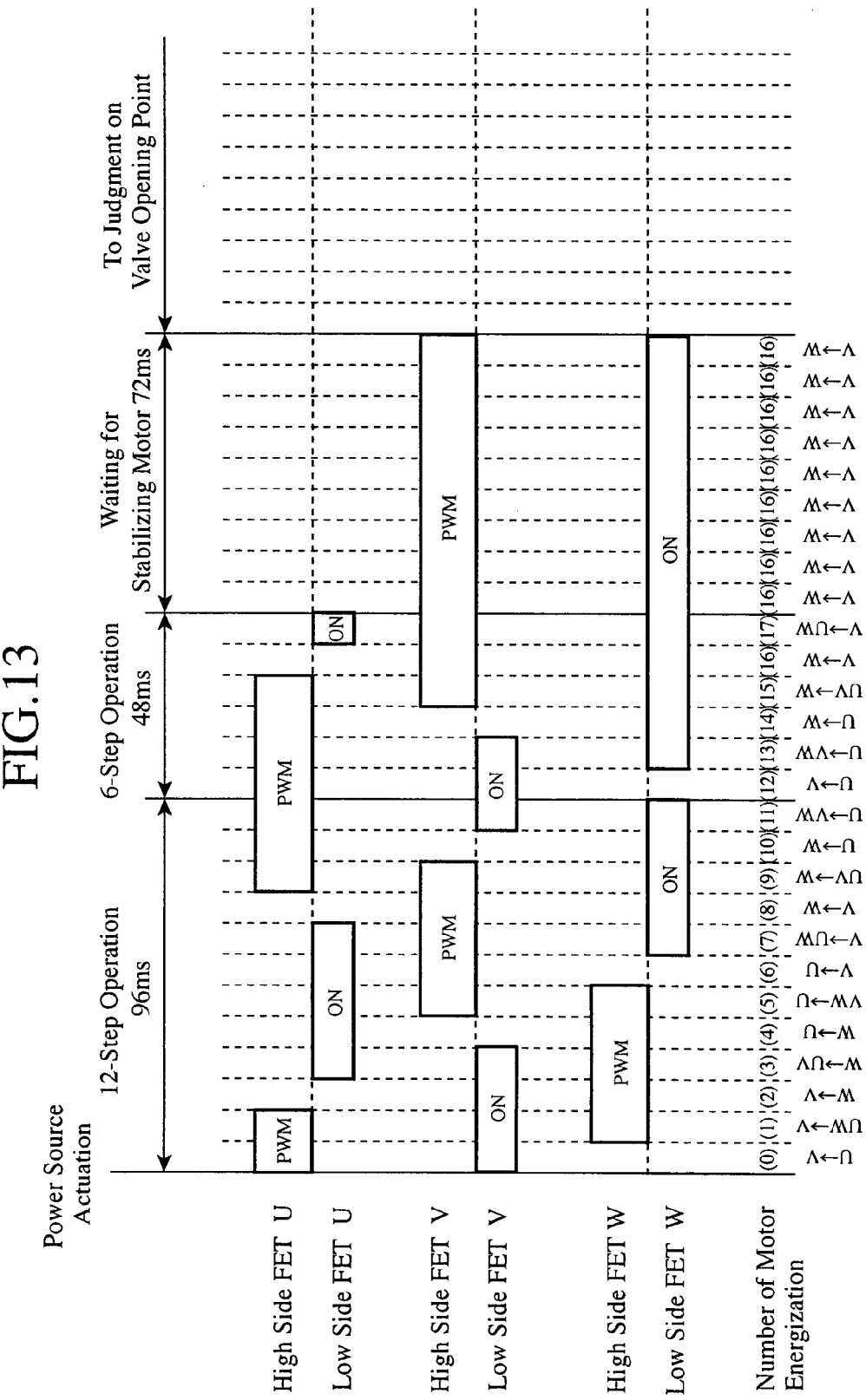
FIG. 13 is a diagram showing the operations of the motor driving circuit at the time of the phase matching performed in the brushless motor apparatus in accordance with the first embodiment of the present invention.

The phase matching is done according to the following procedures of (2-1) to (2-3). FIG. 12 is a diagram showing the movement of the motor shaft 11 at the time of phase matching, and FIG. 13 is a diagram showing the operations of the motor driving circuit with respect to the current supply directions when matching the phase.

(2-1) The stepping operation corresponding to one cycle) (360°) of the electrical angle, that is, 12-step taking-in (referred to as a "12-step operation") is done in the valve closing direction at a speed of 8 ms/step, irrespective of the output pattern of the Hall IC 18. FIG. 14 is a diagram showing the torque curve at the time of 12-step operation.

(2-2) When the motor shaft 11 cannot rotate due to its abutting against the motor stopper at the time of 12-step operation, the phase matching cannot be carried out. For this reason, the stepping operation corresponding to 6 steps in the valve opening direction, namely, the extrusion of 6 steps (referred to as a "6-step operation") is done, thus performing the phase matching. FIG. 15 is a diagram showing the torque curve at the time of 6-step operation.

(2-3) In order to stabilize the brushless motor apparatus 1, namely, to wait for the rest of the rotor 12, energizing is fixedly done just for 72 ms.

(2-4) Finally, the output signal of the Hall IC 18 when energization is done in the direction of is monitored, thus judging that the output pattern of the Hall IC 18 is any of (1)-6) in area A shown in FIG. 6(*a*), and recognizing the current position thereof.

Figure 16:
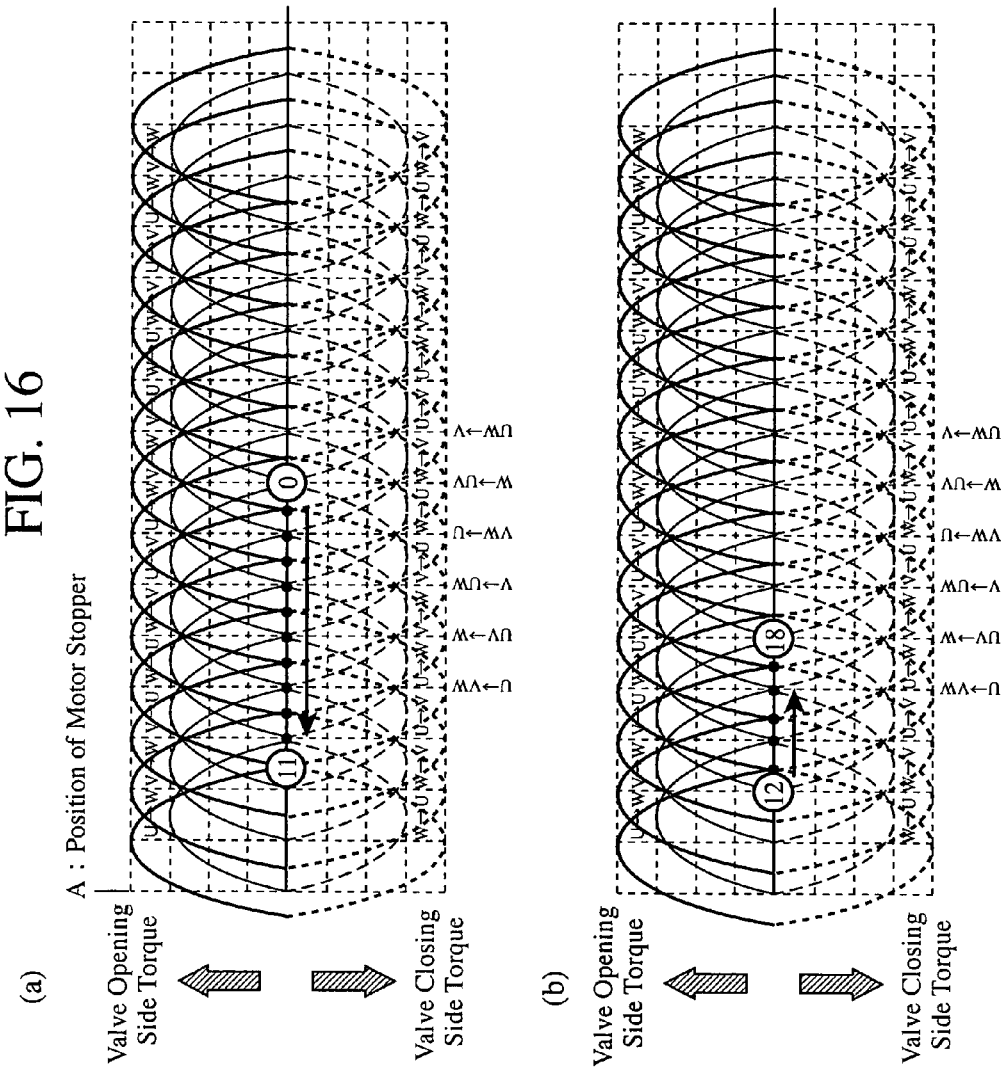
FIG. 16 is a diagram showing the torque curve when the motor stopper is positioned at A in the phase matching operation performed in the brushless motor apparatus in accordance with the first embodiment of the present invention.

In addition, FIG. 16(*a*) shows the torque curve at the time of 12-step taking-in operation when the motor stopper is positioned at the position A, and FIG. 16(*b*) shows the torque curve at the time of 6-step extruding operation when the motor stopper is positioned at the position A. Since, when the motor stopper is positioned at the position A, there does not arise the state where the motor shaft 11 cannot rotate due to its abutting against the motor stopper, the motor shaft 11, after moving by 12 steps in the valve closing direction, moves by 6 steps in the valve opening direction, and the output pattern of the Hall IC 18 becomes any of (1)-(6) in area A shown in FIG. 6(a).

FIG. 17(a) shows the torque curve at the time of 12-step taking-in operation when the motor stopper is positioned at the position B, FIG. 17(b) shows the torque curve when the motor shaft arrives at the position of the motor stopper at the time of 12-step taking-in operation when the motor stopper is positioned at the position B, and FIG. 17(c) shows the torque curve at the time of 6-step extruding operation when the motor stopper is positioned at the position B. Since, when the motor stopper is positioned at the position B, the motor shaft 11 cannot rotate because of its abutting against the motor stopper, the excitation of V→UV is unstable at the position of B, which causes the motor shaft to move in the direction indicated by the arrow shown in the figure. After that, the motor shaft 11 moves by 6 steps in the valve opening direction, and the output pattern of the Hall IC 18 becomes any of (1)-(6) in area A shown in FIG. 6(a).

Figure 19:
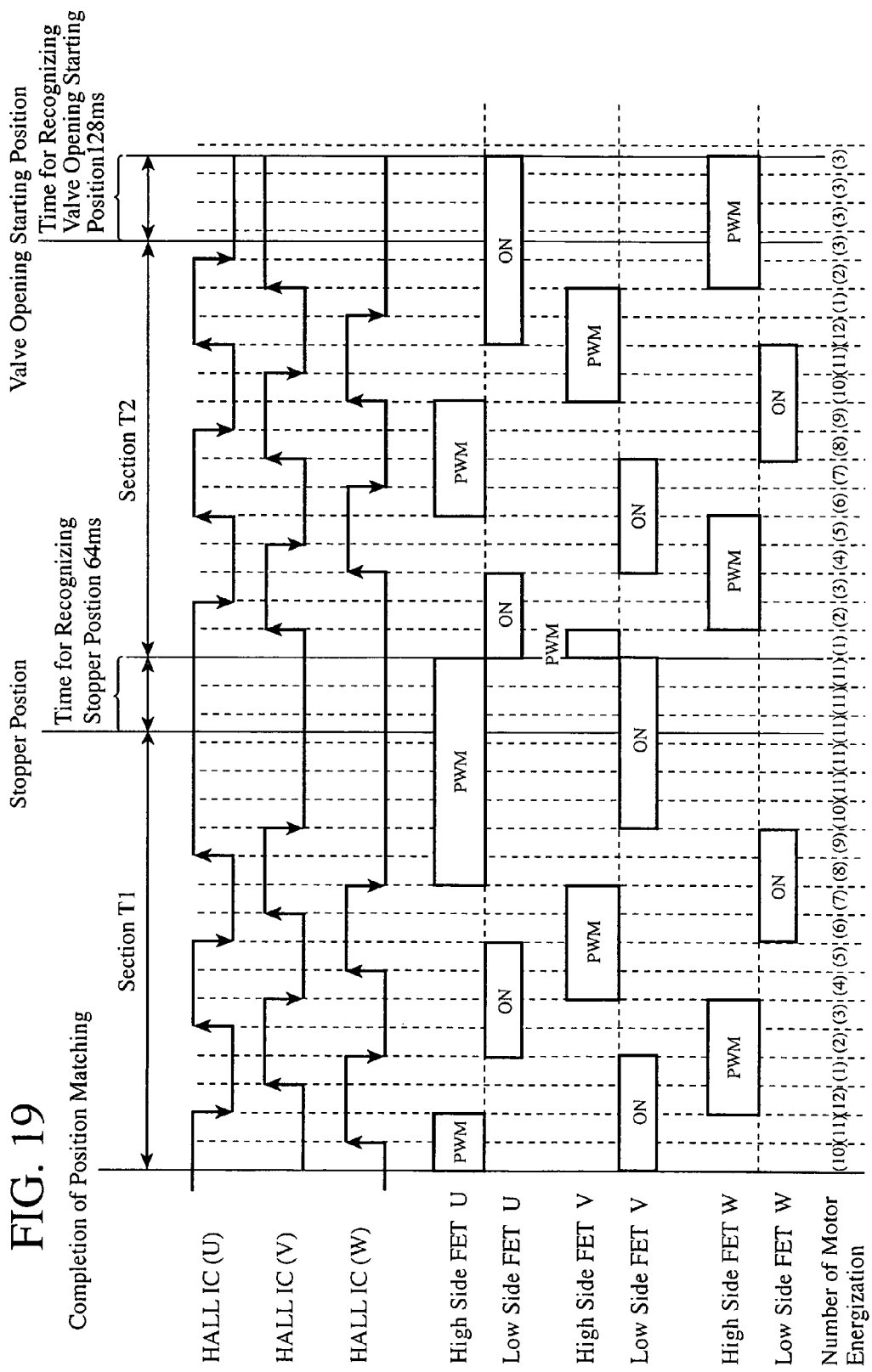
FIG. 19 is a diagram showing the operation of the motor driving circuit at the time of taking-in operation and extruding operation in the initialization operation shown in FIG. 18.

"Taking-in operation" and "Extruding operation" carried out at the time of initialization will next be described. The position of the motor stopper is first detected by the taking-in operation. Specifically, as shown in section T1 of FIG. 18, the rotor 12 is rotated from the position recognized by the above-described phase matching, and the motor shaft 11 is moved in the valve closing direction until the rotor 12 becomes unable to rotate by virtue of the motor shaft 11 abutting against the motor stopper. In that case, the driving duty (the duty of the current applied to the stator 14) is small, and is set to the order of 15%, for example. In this way, the state where the motor shaft 11 becomes overloaded because of its abutting against the motor stopper is relaxed. Further, the position where the rotor 12 becomes unable to rotate is detected as the position of the motor stopper. More specifically, as shown in FIG. 19, when the state where the output pattern of the Hall IC 18 does not change continues for 64 ms, the position of the rotor at the time point is recognized as the position of the motor stopper.

Subsequently, the starting point of valve opening is detected by the extruding operation. Specifically, as shown in section T2 of FIG. 18, the rotor 12 is rotated from the position of the motor stopper in the valve opening direction, and is caused to move until the motor shaft 11 abuts against the valve shaft 22. In that case, the driving duty is set to the order of 8%, for example, that is smaller than that of the above-mentioned case of the taking-in operation. In this way, the valve shaft 22 is adjusted so as not to move, by the urging force of the return spring 23 even if the motor shaft 11 abuts against the valve shaft 22. Furthermore, the position where the motor shaft 11 abuts against the valve shaft 22 is detected as the starting point of valve opening. To be more specific, as shown in FIG. 19, when the state where the output pattern of the Hall IC 18 makes no change continues for 128 ms, the position is recognized as the starting point of valve opening. Thereafter, usual control is performed.

Second Embodiment

The brushless motor apparatus in accordance with the second embodiment of the present invention 2 includes the function of judging whether the operating direction is forward or reverse after the phase matching made in the initializing operation is completed. The configuration of the brushless motor apparatus in accordance with the second embodiment is the same as that of the brushless motor apparatus in accordance with the first embodiment.

Figure 20:
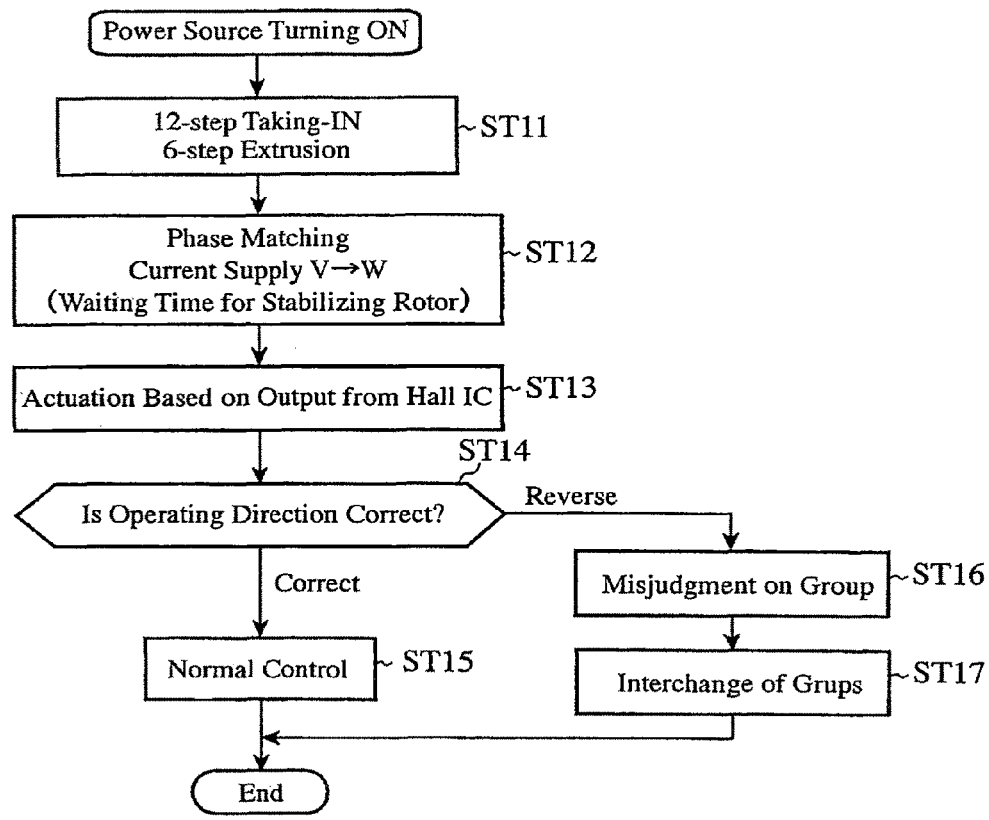
FIG. 20 is a flowchart showing the operations of a brushless motor apparatus in accordance with the second embodiment of the present invention.

FIG. 20 is a flowchart showing the operation of a brushless motor apparatus in accordance with the second embodiment. When the power is turned on, initialization is carried out. In the initialization, 12-step taking-in and 6-step extruding operations for the phase matching are first performed (step ST11). The details of the processing of the step ST11 are the same as those described above. If the motor shaft 11 is stopped in the vicinity of the starting point of valve opening or the vicinity of the position of the motor stopper upon actuation of the power source, the phase matching cannot be normally completed because the rotor 12 cannot move even if the energization of V→W is performed; however, since the processing of the step ST11 frees the motor shaft 11, such accidental locking can be avoided.

Figure 21:
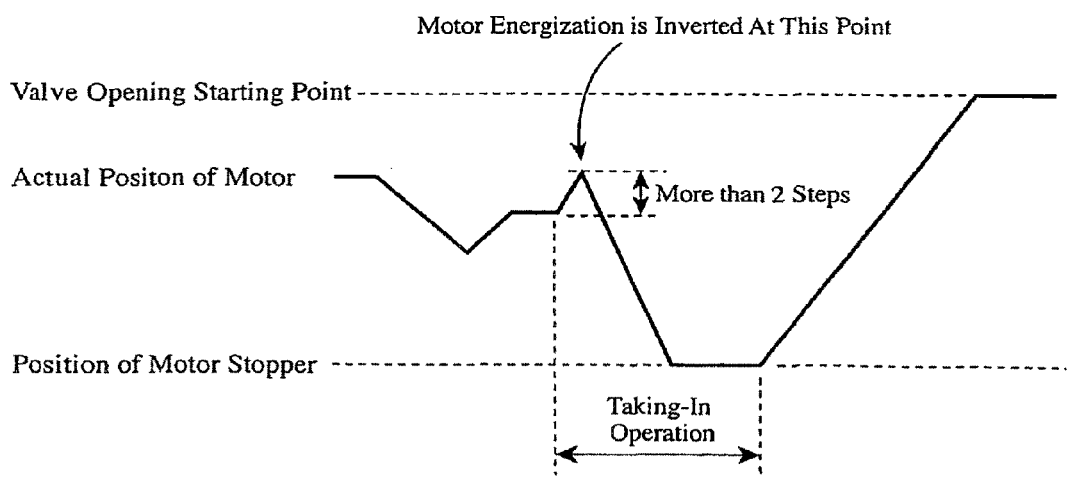
FIG. 21 is a diagram for explaining the operations of the brushless motor apparatus in accordance with the second embodiment of the present invention.

Energization of V→W for the phase matching is next carried out (step ST12). Specifically, in order to wait for the rest of the rotor 12, the energization is fixedly performed for 72 ms, and waiting time for stabilizing the rotor is taken. The rotor 12 is subsequently rotated or driven by sequentially giving the stator 14 current supply patterns of more than 2 steps, for example, based on the output of the Hall IC 18 (step ST13). In that case, if the phase matching in step ST11 and ST12 is not normally ended for any reason, the rotor 12 is sometimes reversely rotated as shown in FIG. 21 to move the motor shaft 11 in the valve opening direction. For this reason, a check is thereafter made about whether the operating direction is correct (step ST15). The check is made by checking whether the output pattern of the Hall IC 18 advances in the opening direction or advances in the closing direction by the microcomputer 32 of the motor driving circuit. In this context, the check may be made when the control of normal F/B (feed-back) is exercised.

When the operating direction is judged to be correct in the above step ST14, usual control is performed (step ST15). In contrast thereto, when the operating direction is judged to be reverse in step ST14, it is realized that a mistake in judging the group was committed (step ST16). In other words, it is realized that the output pattern of the Hall IC at the time of completion of the phase matching is misjudged to exist in area A in spite of the fact that the output pattern thereof existed in area B. Then, the groups are interchanged (step ST 17). In other words, the output pattern of the Hall IC at the time of completion of the phase matching is set to existing in area A.

INDUSTRIAL APPLICABILITY

As mentioned above, the brushless motor apparatus according to the present invention is controlled such that at the time of the phase matching carried out on actuation of a power source, when the stator is excited with another excitation pattern between regular excitation patterns used for normal operation, the rotation angle of the rotor becomes one-half the rotation angle corresponding to the regular excitation pattern, to thus reduce the mechanical vibration of the rotor. It is suitable for use in the driving sources of EGR valves and actuators for emission control such as VG turbo actuators for vehicles.

The invention claimed is:
1. A brushless motor apparatus comprising:
a stator to be fixedly arranged;
a rotor to be rotated in such a manner that the stator is sequentially excited by a plurality of excitation patterns;
a magnetic-pole-position detecting magnet fixedly attached to the rotor and having twice the number of poles of the rotor; and a position detecting element arranged opposite to the magnetic-pole-position detecting magnet and detecting the position of a magnetic pole of the rotor, wherein the brushless motor apparatus includes a motor drive circuit that controls rotation of the rotor such that:

during normal operation, the stator is excited with excitation patterns in a series of steps in which the stator is excited by regular excitation patterns, thus causing the rotor to rotate a first rotation angle at each step during normal operation, and during a time of impedance matching, the stator is excited with excitation patterns in another series of steps in which the stator is alternately excited with one of the regular excitation patterns and another excitation pattern not used for normal operation such that, at each step of impedance matching, the rotor rotates one-half the rotation angle by which the rotor rotates during each step of normal operation, the impedance matching being carried out upon actuation of a power source.

2. The brushless motor apparatus according to claim 1 wherein the regular excitation pattern is an excitation pattern passing an exciting current from one phase to the other one phase, and the other excitation pattern is an excitation pattern passing an exciting current from one phase to the other two phases or from two phases to the other one phase.

3. The brushless motor apparatus according to claim 1 wherein the motor drive circuit switches excitation patterns in the opening direction or the closing direction based on the output patterns of the position detecting element changing according to the rotation of the rotor, and judges whether the direction where the rotor is rotated is different from the desired direction of rotation in the sequence of the output patterns of the position detecting element.

* * * * *